US012288956B1

(12) United States Patent
Woods

(10) Patent No.: US 12,288,956 B1
(45) Date of Patent: Apr. 29, 2025

(54) ELECTRICAL DEVICE ADJUSTMENT TOOL

(71) Applicant: John Woods, Citrus Springs, FL (US)

(72) Inventor: John Woods, Citrus Springs, FL (US)

(73) Assignee: John Woods, Citrus Springs, FL (US)

(*) Notice: Subject to any disclaimer, the term of this patent is extended or adjusted under 35 U.S.C. 154(b) by 646 days.

(21) Appl. No.: 17/489,042

(22) Filed: Sep. 29, 2021

(51) Int. Cl.
*H01R 43/22* (2006.01)
*B25B 7/02* (2006.01)

(52) U.S. Cl.
CPC ............... *H01R 43/22* (2013.01); *B25B 7/02* (2013.01)

(58) Field of Classification Search
CPC .................................. B25B 7/02; H01R 43/22
See application file for complete search history.

(56) References Cited

U.S. PATENT DOCUMENTS

| | | | | |
|---|---|---|---|---|
| 2,577,515 | A | 12/1951 | Durst | |
| 6,134,994 | A | 10/2000 | Gomas | |
| 6,662,690 | B1 | 12/2003 | Ploeger | |
| 6,941,628 | B1 * | 9/2005 | Silverfox | B25B 7/02 81/427 |
| 9,003,930 | B2 | 4/2015 | Mitchell | |
| 2005/0188468 | A1 | 9/2005 | Crawford | |
| 2011/0154957 | A1 * | 6/2011 | Wang | B25B 7/02 81/302 |
| 2018/0345471 | A1 | 12/2018 | Sookoo | |

FOREIGN PATENT DOCUMENTS

| | | | |
|---|---|---|---|
| CN | 201038584 | Y | 3/2008 |
| CN | 204615291 | U | 9/2015 |
| CN | 105834328 | A | 8/2016 |
| EP | 0198064 | A1 | 10/1986 |

OTHER PUBLICATIONS

"Double Delrin Jaw Plier—Parallel Jaws Model #5115", Western Optical Supply, Inc., Mar. 2, 2024, https://westernoptical.com/products/double-delrin-jaw-plier-parallel-jaws-model?variant=13682463342651 (Year: 2024).*

"Eyeglass Adjustment Tools", Western Optical Supply Inc., Jan. 21, 2021,https://web.archive.org/web/20210121153042/https://westernoptical.com/collections/eyeglass-adjustment-tools?page=2 (Year: 2021).*

"30 41 160 Halogen Bulb Exchange Pliers." Knipex, https://web.archive.org/web/20210616205803/https://www.knipex.com/products/gripping-pliers/halogen-bulb-exchange-pliers/halogen-bulb-exchange-pliers/3041160 (Year: 2021).*

"33 Different Types of Pliers Compared (with Pictures)" House Grail, Aug. 18, 2021, https://housegrail.com/different-types of-pliers/ (37 pages).

* cited by examiner

*Primary Examiner* — Livius R. Cazan
(74) *Attorney, Agent, or Firm* — Fish & Richardson P.C.

(57) ABSTRACT

This document describes electrical device adjustment tools. In one aspect, an electrical device adjustment tool includes a first member including a first handle end, a first pivot hole, and a first jaw end including a first base section and a first grasping section which connect to form a first L-shaped notch. The electrical device adjustment tool includes a second member including a second handle end, a second pivot hole, a pivot indentation which provides a range of movement for the first member with respect to the second member, and a second jaw end including a second base section and a second grasping section which connect to form a second L-shaped notch. The electrical device adjustment tool includes a bar extending transversely through the first pivot hole and the second pivot hole. The first member is operable to pivot within the pivot indentation relative to the second member around the bar.

19 Claims, 7 Drawing Sheets

ELECTRICAL DEVICE ADJUSTMENT TOOL

TECHNICAL FIELD

This specification generally relates to hand tools, and in particular, to electrical device adjustment tools for adjusting electrical devices on the face of electrical boxes.

BACKGROUND

Electrical wires often connect to outlets, light switches, and other electrical devices at a connection point. This connection point is susceptible to breaking and causing a separation of the wire from the electrical device. This can occur from physical contact with the wire. As such, electrical boxes provide insulation and protection for these wire connections. Without an electrical box, the connections are vulnerable to becoming loose and detached which will render the outlet inoperable and can cause short circuits, which can even result in a fire.

The electrical devices are commonly screwed to the mounting face of the electrical box. Electrical boxes also typically permit the connection of multiple electrical devices to allow convenient access to multiple switches in a room as well as dual outlets. The electrical boxes are often named depending on how many electrical devices are attached to, e.g., screwed on, the mounting face of the electrical box. For example, a 1-gang box can support one electrical device and a 3-gang box can support three electrical devices. These electrical devices are commonly close together in the electrical box to reduce the amount of space the box occupies on a wall. The electrical box is typically positioned on, e.g., attached to or embedded in, a non-exposed side of the wall which is not visible in a room. The mounting face of the electrical box faces an exposed side of the wall which is visible in the room, and the mounting face is typically intended to be substantially parallel with the exposed surface on the exposed side of the wall. The wall will have a hole or cutout which is similar in size to the mounting face. In this positioning, the electrical devices will be accessible on the exposed side of the wall with minimal protrusion beyond the exposed surface of the wall.

SUMMARY

The electrical device adjustment tools described in this document reduce or eliminate the disadvantages and problems associated with adjusting electrical devices on the mounting face of electrical boxes.

As used in this document, the term electrical device refers to electrical devices that are supported on, e.g., mounted to, the exterior of electrical boxes, e.g., on the mounting face of electrical boxes. Example electrical devices include electrical box mountable outlets, receptacles, and switches (e.g., light switches). Electrical devices are typically connected to the mounting face of the electrical box using one or more screws. However, it is a common occurrence for the electrical device to appear crooked, as a result of being rotated from a correct orientation along an x-axis, y-axis, or z-axis, also referred to as "canted." That is, a canted electrical device can be an electrical device for which a vertical bisector of the front surface of the electrical device is not parallel with a vertical bisector of an exposed surface of a wall and/or a horizontal bisector of the front surface of the electrical device is not parallel with a horizontal bisector of an exposed surface of a wall. Depending on the level of rotation, the device may not only be physically unattractive, but it may be inoperable. For example, an electrical outlet can be rotated from a correct orientation such that a plug cannot be inserted into the outlet, e.g. due to the outlet being too close to other components installed on or in the electrical box.

The electrical device may be canted from a number of factors. For example, the electrical boxes may be canted because of incorrect fastening or subsequent physical contact. Electrical boxes are often surrounded by drywall with only a small cutout for the electrical box. If a builder does not fasten the electrical box properly, even if off by a few degrees, and then the drywall is installed closely around the box, it will be difficult or impossible to correct the electrical box without removing and re-installing drywall. This incorrect fastening can cause the electrical devices mounted to the mounting face of the electrical box to be canted.

An electrical device can also be canted even when the electrical box is perfectly aligned. Parts of an electrical device can become bent when handling prior to installation or the electrical device may simply not sit perfectly square within the electrical box. It can then be difficult to determine how to bend the device into the proper shape unless the device is attached to the electrical box. Furthermore, because of the narrow spaces around the electrical device, it can be impossible to grip the device with enough strength to bend the device while it is attached to the electrical box. Additionally, the electrical device may be attached to wires that are stiff and push the electrical device to be canted either during installation or gradually over time.

One approach to correcting a canted electrical device is removing the entire electrical box and attempting to re-attach it in such a way that the electrical device will "appear" to be correctly aligned, e.g., square with the electrical box, upon completion. However, this approach has several drawbacks. First, it is overly time consuming and tedious, and may require multiple attempts at trial and error. Second, this approach requires working in close proximity to wires carrying significant current, which creates the risk of electrical shock if one forgets to remove power from the affected area. Third, in the event of bent electrical devices, this approach may not allow for the correction of multiple electrical devices housed in the same electrical box because of the small amount of space between electrical devices. Lastly, in the event of a crooked drywall cutout, even the most skilled artisan will not be able to achieve perfectly square electrical devices without cutting out more drywall. Of course, this issue would only be exacerbated in the event of a cement or brick wall.

The electrical device adjustment tools described in this document allow for gripping the electrical device itself, and correcting the rotation such that the device is no longer canted relative to the wall in which it is installed, without the need to remove the entire electrical box. Absent the electrical device adjustment tools described in this document, this was impossible to achieve in a safe manner using other tools. First, there are typically only small gaps in which one could grip the electrical device on the mounting face of the electrical box for adjustment. As previously mentioned, electrical boxes can have multiple electrical devices in a single electrical box and when multiple electrical devices are crowded in a single electrical box, it can be even more difficult to find anything to grip on the electrical devices. Further yet, electrical boxes may be left untouched for a long time, and wires can become loose, creating a dangerous situation for a person attempting to adjust the electrical device without an insulated tool. Previously, the person working with the electrical box might attempt to grip the electrical device with standard pliers or a similar tool to adjust the positioning of the electrical device. Not only is it difficult to grip the canted device using conventional tools, but such a practice is widely considered highly dangerous to both the individual and the electrical components. No conventional tool exists that provides both a narrow enough construction to fit between the adjacent electrical devices and around the canted electrical device to be adjusted, yet also provides a strong enough construction capable of providing sufficient force to make the desired adjustment. An electrical box typically concentrates all of the wires behind the electrical device(s). If attempting to get a strong enough grip using conventional tools, an individual may choose a longer yet narrow tool that fits between the electrical devices for increased strength. However, the additional length would create the adverse effect that such a tool may reach too far back in the box and make contact with wires, Not only will this create unnecessary risk of damage to the wires, but if the individual forgot to turn off the power to the electrical box, the individual could be dealt an electrical shock causing bodily harm. Conventional tools small enough to fit in the gap will not be strong enough to make the adjustment without bending or breaking, and/or are too long to safely make the adjustments without contacting wires.

In general, one innovative aspect of the subject matter described in this specification can be embodied in an electrical device adjustment tool that includes a first member including a first handle end, a first pivot hole, and a first jaw end comprising a first base section and a first grasping section which connect to form a first L-shaped notch and a second member that includes a second handle end, a second pivot hole, a pivot indentation which provides a range of movement for the first member with respect to the second member, and a second jaw end that includes a second base section and a second grasping section which connect to form a second L-shaped notch. The electrical device adjustment tool can include a bar extending transversely through the first pivot hole and the second pivot hole wherein the first member is operable to pivot within the range of the pivot indentation relative to the second member around the bar. The electrical device adjustment tool can also include one or more insulating coatings on at least one of the first handle end, the first jaw end, the second handle end, and the second jaw end. The first L-shaped notch and the second L-shaped notch can be in an inverse configuration.

In some aspects the insulating coatings includes a plastic material. In some aspects, the insulating coatings includes a rubber material. The rubber material can be an air-dry rubber material.

In some aspects, the first base section includes a first base section width and the first grasping section includes a first grasping section width which is less than the first base section width. The first base section width can be less than 1.0 inch and the first grasping section width can be less than 0.5 inches.

In some aspects, the first L-shaped notch and the second L-shaped notch are operable to form a U shape when the first grasping section is parallel to the second grasping section. In some aspects, the first jaw end includes a first grasping section face and the second jaw end includes a second grasping section face. The one or more insulating coatings cover the first grasping section face.

In some aspects, the first jaw end and the second jaw end are separated by a jaw width wherein the jaw width is less than 3 inches. In some aspects, the first grasping section includes a first grasping section length and wherein the first grasping section length is greater than 0.5 inches. The first grasping section length can be less than 3 inches. The first grasping section length can be adjustable. In some aspects, the first grasping section includes a first curved portion and the second grasping section includes a second curved portion.

In general, another innovative aspect of the subject matter described in this specification can be embodied in a method for adjusting the orientation of an electrical device comprising a first side and a second side. The method includes holding an electrical device adjustment tool. The electrical device adjustment tool includes a first member comprising a first handle end, a first pivot hole, and a first jaw end comprising a first base section and a first grasping section which connect to form a first L-shaped notch and a second member comprising a second handle end, a second pivot hole, a pivot indentation which provides a range of movement for the first member with respect to the second member, and a second jaw end comprising a first base section and a second grasping section which form a second L-shaped notch. The electrical device adjustment tool can include a bar extending transversely through the first pivot hole and the second pivot hole wherein the first member is operable to pivot within a range of the pivot indentation relative to the second member around the bar. The electrical device adjustment tool can also include one or more insulating coatings on at least one of the first handle end, the first jaw end, the second handle end, and the second jaw end. The first L-shaped notch and the second L-shaped notch can be in an inverse configuration. The method for adjusting the orientation of an electrical device can include inserting the first grasping section of the electrical device adjustment tool adjacent the first side of the electrical device and the second grasping section of the electrical device adjustment tool adjacent the second side of the electrical device. The method can include compressing the first handle end and the second handle end such that the first grasping section is in contact with the first side of the electrical device and the second grasping section is in contact with the second side of the electrical device. The method can include performing adjustments such that the electrical devices is in a suitable orientation.

In some aspects, the insulating coatings comprise a rubber material. The first base section can include a first base section width and the first grasping section can includes a first grasping section width which is less than the first base section width. The first base section width can be less than 1.0 inch and the first grasping section width can be less than 0.5 inches.

In general, another innovative aspect of the subject matter described in this specification can be embodied in a method of making an electrical device adjustment tool. The method includes forming a first member that includes a first handle end, a first pivot hole, and a first jaw end comprising a first base section and a first grasping section which connect to form a first L-shaped notch and forming a second member that includes a second handle end, a second pivot hole, a pivot indentation which provides a range of movement for the first member with respect to the second member, and a second jaw end that includes a first base section and a second grasping section which form a second L-shaped notch. The first member is attached to the second member such that the first L-shaped notch and the second L-shaped notch are in an inverse configuration using a bar extending transversely through the first pivot hole and the second pivot hole wherein the first member is operable to pivot within a range of the pivot indentation relative to the second member around the bar. In some aspects, at least one of the first handle end, the first jaw end, the second handle end, or the second jaw end can be covered with one or more insulating coatings. In some aspects, the covering the at least one of the first handle end, the first jaw end, the second handle end, or the second jaw end with one or more insulating coatings includes using an air-dry rubber material.

Particular embodiments of the subject matter described in this specification can be implemented to realize one or more of the following advantages. For example, certain implementations have jaws that are L-shaped such that they are able to fit between electrical devices on an electrical box such that the device can grip the electrical device in order to adjust the positioning and/or orientation of the electrical box. The jaw shape allows for a device with increased tensile strength while remaining narrow enough at the contact point to fit beside an adjacent electrical device fit snugly into an electrical box with the electrical device being adjusted. Furthermore, certain implementations are shaped to provide a stronger grip for grabbing the electrical device to adjust the canted electrical boxes. Each L-shaped jaw includes a grasping section face and a base section face to increase the amount of surface area in contact with the electrical device. This increased surface area allow the electrical device adjustment tool to adjust the positioning of the electrical device when screwed into an electrical box or partially screwed into an electrical box. Furthermore, certain implementations include insulation applied strategically across the device so as to reduce the risk of an electrical shock in the event a live wire is inadvertently touched by the device. The insulation can be included on the jaw ends and the handle ends to provide multiple layers of insulation between the operator's hand and potentially live wires.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In the following description of implementations of the electrical device adjustment tools, numerous specific details are set forth in order to provide a more thorough understanding of the electrical device adjustment tools. However, it will be apparent to one skilled in the art that the electrical device adjustment tools may be practiced without one or more of these specific details. In other instances, well-known features have not been described in detail to avoid unnecessarily complicating the description.

Generally, implementations of the electrical device adjustment tools relate to an apparatus and method for correcting a canted electrical device housed in or on an electrical box without the need to remove the electrical box from the wall (or other surface) in which the electrical box is installed.

Figure 1A:
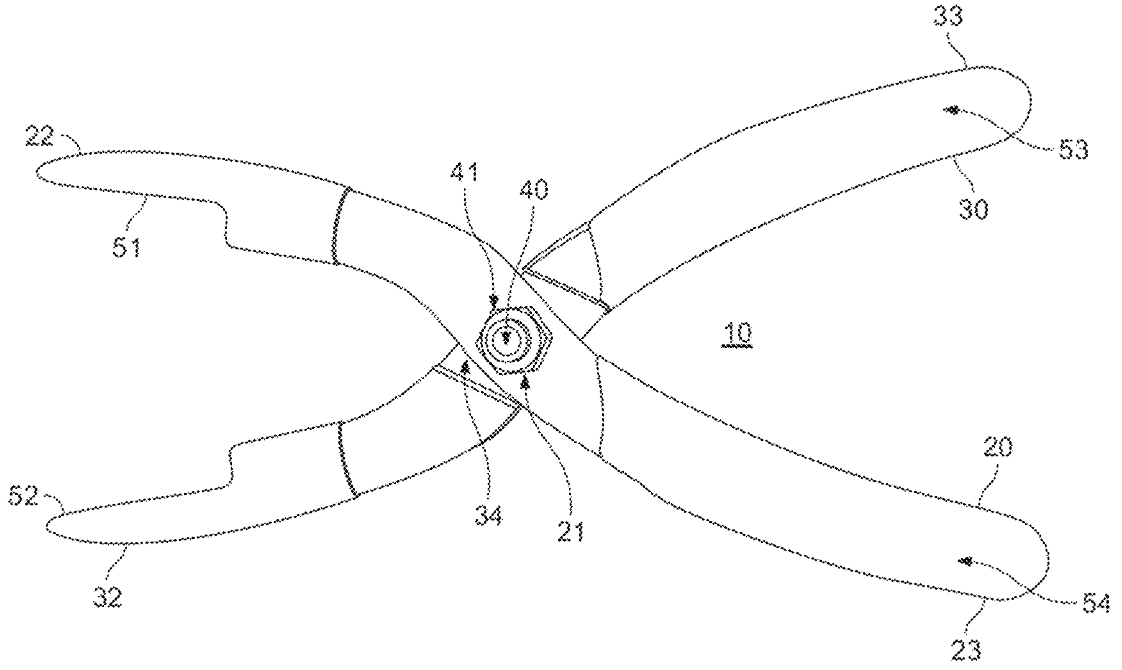
FIG. 1A is a top view of an example electrical device adjustment tool in an open configuration.

FIG. 1A illustrates a top view of an example electrical device adjustment tool 10 in an open configuration. The electrical device adjustment tool 10 can be used to adjust the position, e.g., orientation or alignment, of electrical devices of electrical boxes, e.g., electrical devices mounted on the mounting face of electrical boxes.

Electrical device adjustment tool 10 includes a first member 20 and a second member 30. The first member 20 and the second member 30 can each be formed from a material such as steel or aluminum. Steel provides a higher tensile strength which can create a stronger device. Alternatively, aluminum can be used to provide a lighter and cheaper electrical device adjustment tool. Other appropriate metals, metal alloys, or other materials can also be used. The first member 20 and the second member 30 include a first pivot hole 21 (hidden by bolt 40) and a second pivot hole (not pictured) respectfully. The second member 30 further includes pivot indentation 34. The first pivot hole 21 and the second pivot hole are operable to line up such that a bar (such as a bolt 40) can pass through both the first pivot hole 21 and the second pivot hole. The bolt 40 can be secured using the nut 41. That is, the bolt 40 can be passed through the pivot holes and secured using the nut 41 to attach the first member 20 to the second member 30. The bolt 40 enables the first member 20 to pivot with respect to the second member 30 within the pivot indentation 34. The pivot indentation 34 is a recessed area of the second member 30 that provides a range of movement for the first member 20 with respect to the second member 30.

The first member 20 includes a first jaw end 22 and a first handle end 23. The second member includes a second jaw end 32 and a second handle end 33. The first jaw end 22, the second jaw end 32, the second handle end 33, and the first handle end 23 can be covered in insulating coatings such as rubber coating 51, rubber coating 52, rubber coating 53, and rubber coating 54, respectively. Other implementations may use other types of insulating coatings such as plastic. Insulating coatings may be formed on the various components of the electrical device adjustment tool using several techniques including using an air dry rubber material.

Figure 1B:
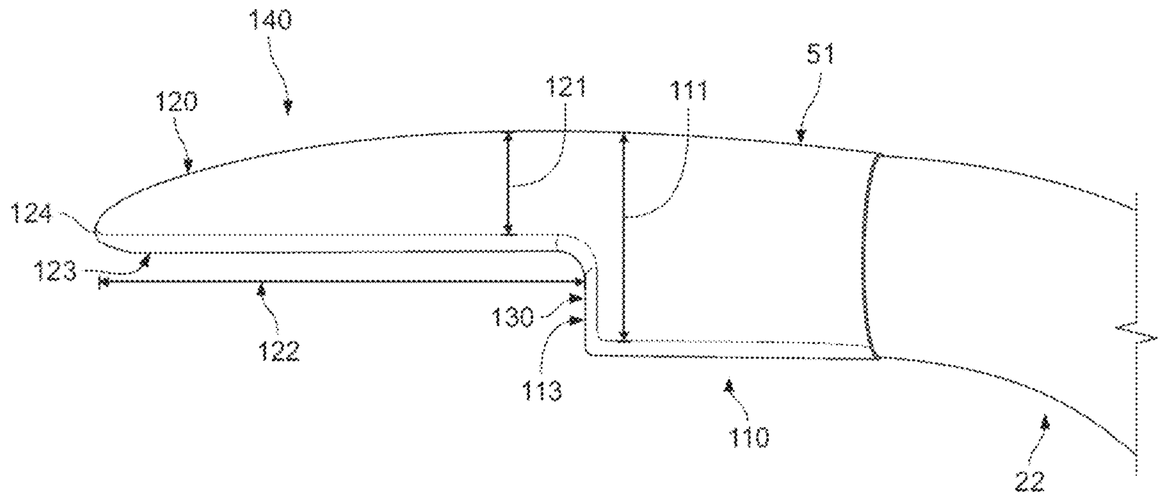
FIG. 1B is a top view of the first jaw end of the electrical device adjustment tool of FIG. 1A.

FIG. 1B illustrates a top view of the first jaw end 22 of the electrical device adjustment tool 10 of FIG. 1A. The first jaw end 22 includes a first base section 110 and a first grasping section 120. The first jaw end 22 also includes a first curved portion 140. The first curved portion 140 allows easier insertion into narrow spaces around electrical devices because it allows for the first grasping section 120 to have a narrower first grasping section tip 124. The narrower first grasping section tip 124 makes it easier to aim the first grasping section 120 into the small gaps on the outside of electrical devices. The first base section 110 has a first base section width 111. The first base section width 111 is the width of the first base section 110 under a first base section face 113. In some implementations, the first base section width 111 is about 0.5 inches (e.g., within a tolerance of 0.1 inches). Other widths can also be used, but it is advantageous to have a width greater than 0.25 inches to provide sufficient surface area for gripping the front of the electrical device when adjusting the position of the device.

The first grasping section 120 has a first grasping section width 121. In some implementations, first grasping section width 121 is 25 inches. Other widths can be used, but it is advantageous to have widths narrow enough to fit in the narrow gaps between electrical devices on the mounting face on the electrical box. As such the electrical device adjustment tools include a range of first grasping section widths less than 0.5 inches, e.g., 0.25 inches, 0.30 inches, 0.40 inches, or another appropriate width.

The first grasping section 120 has a first grasping section length 122. In some implementations, the first grasping section length 122 is 1.5 inches or another appropriate length. Other lengths can also be used, but it is advantageous to have a length that is greater than 0.5 inches to provide sufficient surface area for gripping the side of the electrical device when adjusting the position of the device. Additionally, it certain implementations, it is advantageous to have lengths less than 3 inches so that the first grasping section will not extend into electrical box and potentially disconnect wires from the electrical device. Certain other implementations may have a variable length such that the grasping section length can be adjusted depending on the electrical device for which it is being used.

The first base section 110 and the first grasping section 120 form a first L-shaped notch 130. The first base section 110 further includes the first base section face 113, and the first grasping section 120 further includes a first grasping section face 123. The first base section face 113 and the first grasping section face 123 form the L-shaped notch 130. In some implementations, the first base section face 113 is perpendicular or substantially perpendicular (e.g., within 5 degrees of a 90 degree angle between the surfaces) to the first grasping section face 123. In some implementations, the first jaw end 22 includes a curved surface that connects the first base section face 113 to the first grasping section face 123, e.g., rather than a right angle where the two sections meet.

The first base section face 113 and the first grasping section face 123 are operable to be in contact with a front of electrical device and a side of the electrical device respectively such that L-shaped notch 130 is substantially in contact with the corner of the electrical device. For example, a user, e.g., technician or electrician, can open the electrical device adjustment tool 10 and place the first jaw end 22 and the second jaw end 32 around the electrical device such that the L-shaped notch 130 contacts one corner of the electrical device and a corresponding L-shaped notch of the second jaw end contacts an opposite corner of the electrical device. Additionally, the first jaw end 22 can be covered in an insulating coating such as rubber coating 51. Rubber coating 51 covers areas such as first grasping section face 123 to provide additional grip when grasping an electrical device. Rubber coating also provides insulation to prevent electrical shock from incidental contact with electrical wires inside an electrical box.

Figure 1C:
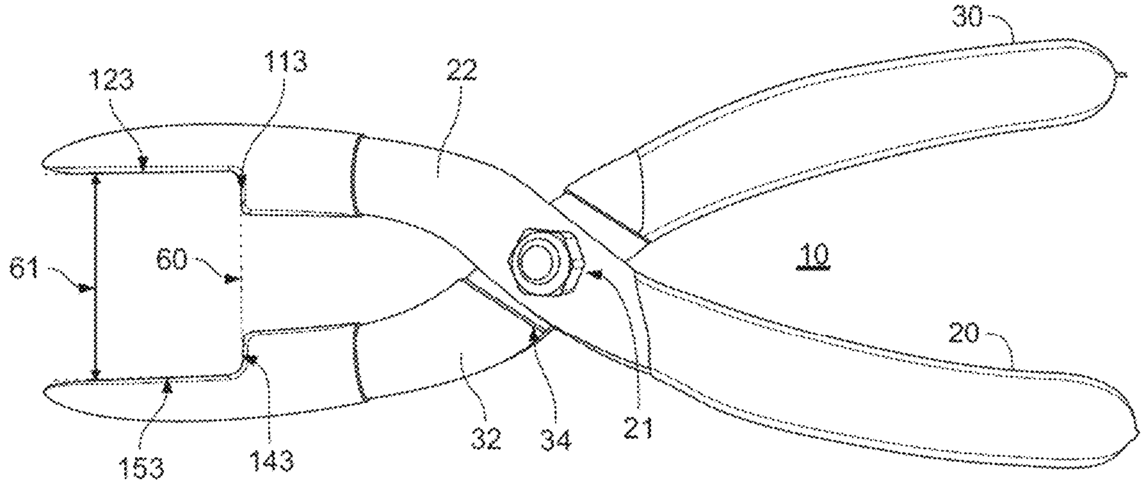
FIG. 1C is a top view of the electrical device adjustment tool of FIG. 1A in a partially closed configuration.

FIG. 1C illustrates a top view of the electrical device adjustment tool 10 in a partially closed configuration. In FIG. 1C, the electrical device adjustment tool 10 is in a partially closed configuration such that the first base section face 113, the first grasping section face 123, a second base section face 143, and a second grasping section face 153 form a broken U shape 60. In this configuration, the first base section face 113 and the second base section face 143 are substantially parallel, and the first grasping section face 123 and the second grasping section face 153 are substantially parallel Additionally, in this partially closed configuration, the first grasping section face 123 and the second grasping section face 153 are separated by a jaw width 61. The jaw width is a distance between the first grasping section face 123 and the second grasping section face 153. In some implementations, when the electrical device adjustment tool 10 is in a partially closed position that forms the U shape, the jaw width 61 is about 1¼ inches (e.g., within a tolerance of ⅛ inch), about 1½ inches, between one and two inches, or another appropriate width. Other widths can also be used, but it is advantageous for use with electrical devices mounted on typical or common electrical boxes to have a jaw width less than or equal to 3 inches to allow jaw ends to fit in gaps between electrical devices. As such, electrical device adjustment tools include a range of jaw widths less than or equal to 3 inches, e.g., 1 inch, 2 inches, 3 inches, or another appropriate width. The jaw width can vary based on the type of devices with which the electrical device adjustment tool 10 will be used. When the device is in a fully closed position, the jaw width may be about ½ inch shorter than the jaw width when partially closed or another appropriate width. Alternatively, the U shape may be formed when the device is in the fully closed position.

Figure 2:
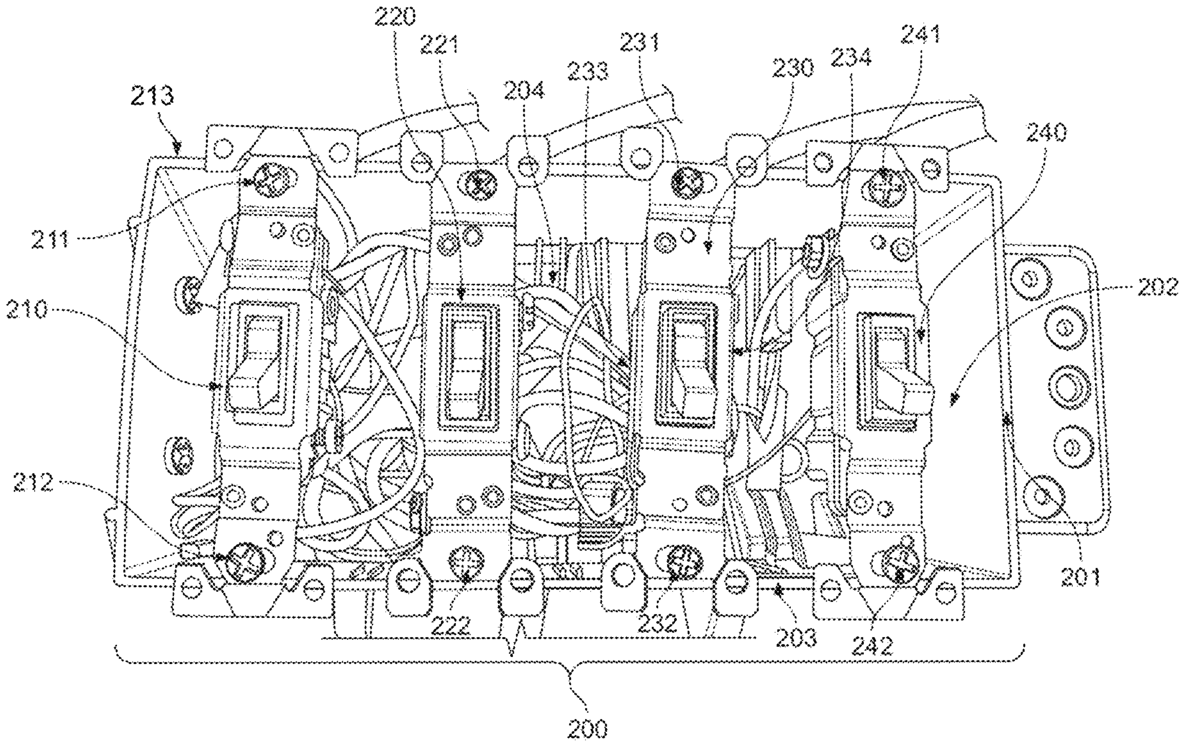
FIG. 2 is a perspective view of a canted electrical device on the mounting face of an electrical box.

FIG. 2 illustrates a perspective view of a canted electrical device 230 on the mounting face of an electrical box 200. Electrical box 200 has mounting face 201 and an interior 202. Mounting face 201 provides a perimeter along which electrical devices can be mounted and this perimeter has a top section 213 and a corresponding bottom section 203 opposite the top section Various types of electrical devices can be mounted on the mounting face, e.g., by attaching a top portion of the electrical device to the top section 213 and a bottom portion of the electrical device to the bottom section 203. For example, light switch 210 is attached to mounting face 201 with screw 211 and screw 212. Similarly, light switch 220, light switch 230, and light switch 240 are attached to mounting face 201 with screws 221 and 222, screws 231 and 232, and screws 241 and 242 respectively. The light switches 210, 220, 230, and 240 are example electrical devices mounted on the mounting face 201 of the electrical box 200. Within interior 202 are a plurality of wires 204. Light switch 230 is currently canted such that a first vertical side 233 and a second vertical side 234 of the light switch 230 are not perpendicular with the bottom section 203. Because of the multiple light switches, wires 204 occupy a significant amount of the space in interior 202 which creates a risk for a technician attempting to adjust light switch 230 to correct the canted position.

Figure 3:
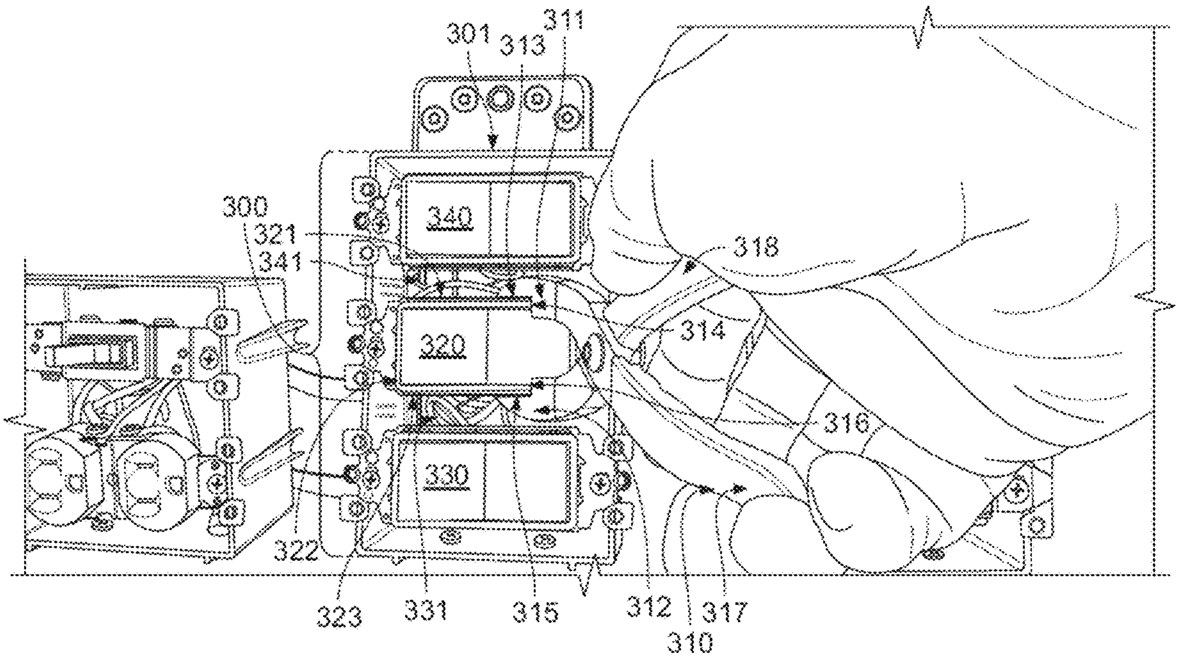
FIG. 3 shows a person using an electrical device adjustment tool to grip a light switch on the mounting face of an electrical box.

FIG. 3 shows a person using the electrical device adjustment tool 310 to grip a light switch 320 on mounting face 301 of electrical box 300. Light switch 320 is separated from light switch 330 and light switch 340 by gap 331 and gap 341 respectively. Gap 331 and gap 341 are too narrow for conventional tools to be able to effectively grip light switch 320. Electrical device adjustment tool 310 includes first grasping section 311 and second grasping section 312 which are able to fit within gap 341 and gap 331 respectively. Additionally, electrical device adjustment tool 310 includes a first grasping section face 313, a first base section face 314, a second grasping section face 315, and a second base section face 316. The first grasping section face 313 is in contact with a top surface 321 of light switch 320 and the first base section face 314 is in contact with front surface 322 of light switch 320. Additionally, second grasping section face 315 and second base section face 316 are in contact with a bottom surface 323 and front surface 322 respectively. The several points of contact of the broken U-shape formed from these four surfaces provide for a stronger grip of the electrical device. The user of the electrical device adjustment tool 310 will then squeeze a first handle end 317 and a second handle end 318 and rotate the electrical device adjustment tool 310 and thereby move light switch 320 to have a desired positioning (e.g. make light switch 320 to be no longer canted).

Figure 4:
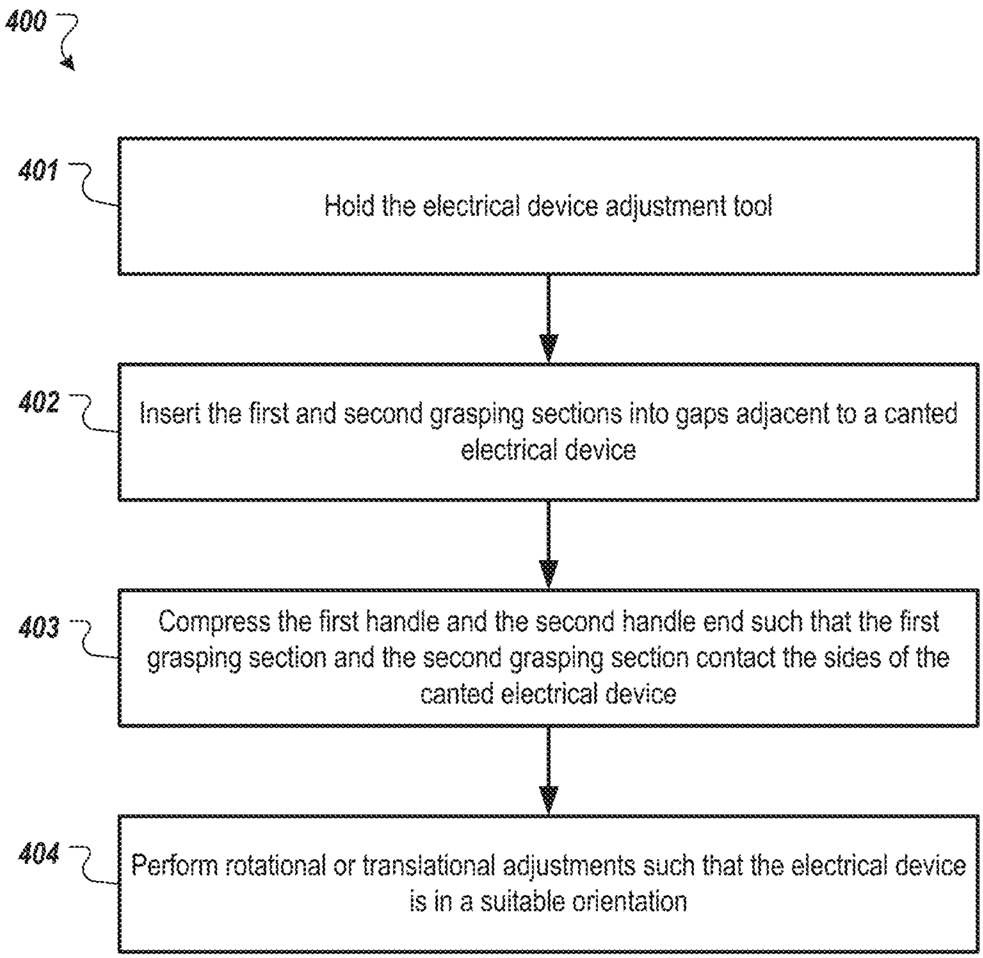
FIG. 4 is a flow diagram of an example process of using an electrical device adjustment tool to adjust the orientation of an electrical device on the mounting face of an electrical box.

FIG. 4 illustrates a flow diagram of an example process 400 of using an electrical device adjustment tool to adjust the orientation of an electrical device on the mounting face of an electrical box. A technician holds the electrical adjustment device at a first handle end 23 and a second handle end 33 (401). The technician inserts a first grasping section 120 of the first jaw end 22 into a gap 341 adjacent to a first side of a canted electrical device 320, and inserts a second grasping section of a second jaw end 32 into a gap 331 adjacent to a second side of the canted electrical device 320 (402). The technician compresses the first handle end 23 and second handle end 33 such that the first grasping section 120 and the second grasping section are in contact with a first and second side, respectively, of canted electrical device 320 (403). The technician performs adjustments to canted electrical device 320 (404). These adjustments can include, but are not limited to, rotational and translational movements, in order to cure the canted orientation and position of electrical device 320 in an orientation suitable for the technician.

Figure 5:
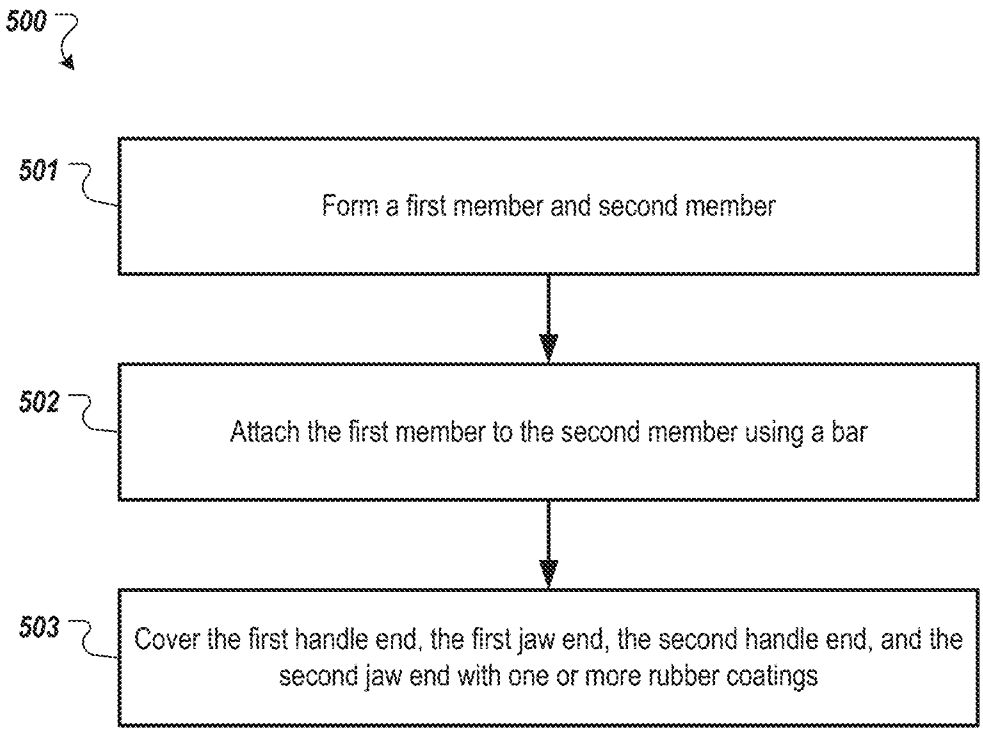
FIG. 5 is a flow diagram of an example process of forming an electrical device adjustment tool.

FIG. 5 illustrates a flow diagram of an example process 500 of forming an electrical device adjustment tool adjustment tool 10. A manufacturer forms a first member 20 and a second member 30 using a material such as aluminum (501). Using aluminum for the first member 20 and second member 30 makes it easier to form the first member 20 and second member 30. However, other materials can be used such as steel. A manufacturer inserts a bar, such as a bolt 40, through a first pivot hole 21 and a second pivot hole on second member 30 (502). The first member 20 and the second member 30 are attached such that such that a first L-shaped notch 130 on a first jaw end 22 and a second L-shaped notch on a second jaw end 32 are in an inverse configuration. By attaching the first member 20 to the second member 30 in this way, the first member 20 is operable to pivot within a pivot indentation 34 relative to the second member 30 around the bolt 40. A manufacturer dips first handle end 21, first jaw end 22, second handle end 31, and second jaw end 32 in an air-dry rubber material (503). This air dry rubber material is then given time to dry to form a rubber coating 51. It is contemplated that other methods of forming insulating coatings may be used. It is also contemplated that not all of first handle end 21, first jaw end 22, second handle end 31, and second jaw end 32 would include an insulating coating. It is also contemplated that parts of first member 20 and second member 30 can be covered in an insulating coating prior to attaching first member 20 to second member 30.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An electrical device adjustment tool comprising:

a first member comprising a first handle end, a first pivot hole, and a first jaw end comprising a first base section and a first grasping section, wherein the first jaw end comprises a first step at a first point of transition from the first base section to the first grasping section that forms a first L-shaped notch;

a second member comprising a second handle end, a second pivot hole, a pivot indentation which provides a range of movement for the first member with respect to the second member, and a second jaw end comprising a second base section and a second grasping section, wherein the second jaw end comprises a second step at a second point of transition from the second base section to the second grasping section that forms a second L-shaped notch, wherein an inner surface of the first grasping section is offset from an inner surface of the first base section and an inner surface of the second grasping section is offset from an inner surface of the second base section such that a first distance between the inner surface of the first grasping section and the inner surface of the second grasping section is greater than a second distance between the inner surface of the first base section and the inner surface of the second base section;

a bar extending transversely through the first pivot hole and the second pivot hole wherein the first member is operable to pivot within the range of the pivot indentation relative to the second member around the bar; and one or more insulating coatings on each of the first handle end, the first jaw end, the second handle end, and the second jaw end, wherein the insulating coating on the first jaw end spans portions of both the first base section and the first grasping section, wherein the insulating coating on the second jaw end spans portions of both the second base section and the second grasping section, wherein the first L-shaped notch and the second L-shaped notch are in an inverse configuration.

2. The electrical device adjustment tool of claim 1, wherein the one or more insulating coatings comprise a plastic material.

3. The electrical device adjustment tool of claim 1, wherein the one or more insulating coatings comprise a rubber material.

4. The electrical device adjustment tool of claim 3, wherein the rubber material is an air-dry rubber material.

5. The electrical device adjustment tool of claim 1, wherein the first base section includes a first base section width and wherein the first grasping section includes a first grasping section width which is less than the first base section width.

6. The electrical device adjustment tool of claim 5, wherein the first base section width is less than 1.0 inch and wherein the first grasping section width is less than 0.5 inches.

7. The electrical device adjustment tool of claim 1, wherein the first L-shaped notch and the second L-shaped notch are operable to form a U shape when the first grasping section is parallel to the second grasping section.

8. The electrical device adjustment tool of claim 1, wherein the first jaw end comprises a first grasping section face and wherein the second jaw end comprises a second grasping section face.

9. The electrical device adjustment tool of claim 8, wherein one or more insulating coatings covers the entirety of the first grasping section face.

10. The electrical device adjustment tool of claim 1, wherein the first jaw end and the second jaw end are separated by a jaw width wherein the jaw width is less than 3 inches.

11. The electrical device adjustment tool of claim 1, wherein the first grasping section comprises a first grasping section length and wherein the first grasping section length is greater than 0.5 inches.

12. The electrical device adjustment tool of claim 11, wherein the first grasping section length is less than 3 inches.

13. The electrical device adjustment tool of claim 1, wherein the first grasping section comprises a first curved portion and wherein the second grasping section comprises a second curved portion.

14. A method for adjusting the orientation of an electrical device comprising a first side and a second side comprising:

holding an electrical device adjustment tool comprising, a first member comprising a first handle end, a first pivot hole, and a first jaw end comprising a first base section and a first grasping section, wherein the first jaw end comprises a first step at a first point of transition from the first base section to the first grasping section that forms a first L-shaped notch;

a second member comprising a second handle end, a second pivot hole, a pivot indentation which provides a range of movement for the first member with respect to the second member, and a second jaw end comprising a second base section and a second grasping section, wherein the second jaw end comprises a second step at a second point of transition from the second base section to the second grasping section that forms a second L-shaped notch, wherein an inner surface of the first grasping section is offset from an inner surface of the first base section and an inner surface of the second grasping section is offset from an inner surface of the second base section such that a first distance between the inner surface of the first grasping section and the second grasping section is greater than a second distance between the inner surface of the first base section and the inner surface of the second base section;

a bar extending transversely through the first pivot hole and the second pivot hole wherein the first member is operable to pivot within a range of the pivot indentation relative to the second member around the bar; and one or more insulating coatings on each of the first handle end, the first jaw end, the second handle end, and the second jaw end, wherein the insulating coating on the first jaw end spans portions of both the first base section and the first grasping section, wherein the insulating coating on the second jaw end spans portions of both the second base section and the second grasping section; and wherein the first L-shaped notch and the second L-shaped notch are in an inverse configuration;

inserting the first grasping section of the electrical device adjustment tool adjacent the first side of the electrical device and the second grasping section of the electrical device adjustment tool adjacent the second side of the electrical device;

compressing the first handle end and the second handle end such that the first grasping section is in contact with the first side of the electrical device and the second grasping section is in contact with the second side of the electrical device; and performing adjustments such that the electrical device is in a suitable orientation.

15. The method of claim 14, wherein the one or more insulating coatings comprise a rubber material.

16. The method of claim 14, wherein the first base section includes a first base section width and wherein the first grasping section includes a first grasping section width which is less than the first base section width.

17. The method of claim 14, wherein the first base section width is less than 1.0 inch and wherein the first grasping section width is less than 0.5 inches.

18. A method for making an electrical device adjustment tool comprising:

forming a first member comprising a first handle end, a first pivot hole, and a first jaw end comprising a first base section and a first grasping section, wherein the first jaw end comprises a first step at a first point of transition from the first base section to the first grasping section that forms a first L-shaped notch;

forming a second member comprising a second handle end, a second pivot hole, a pivot indentation which provides a range of movement for the first member with respect to the second member, and a second jaw end comprising a second base section and a second grasping section, wherein the second jaw end comprises a second step at a second point of transition from the second base section to the second grasping section that forms a second L-shaped notch, wherein an inner surface of the first grasping section is offset from an inner surface of the first base section and an inner surface of the second grasping section is offset from an inner surface of the second base section such that a first distance between the inner surface of the first grasping section and the second grasping section is greater than a second distance between the inner surface of the first base section and the inner surface of the second base section;

attaching the first member to the second member such that the first L-shaped notch and the second L-shaped notch are in an inverse configuration using a bar extending transversely through the first pivot hole and the second pivot hole wherein the first member is operable to pivot within a range of the pivot indentation relative to the second member around the bar; and covering each of the first handle end, the first jaw end, the second handle end, and the second jaw end with one or more insulating coatings, wherein the insulating coating on the first jaw end spans portions of both the first base section and the first grasping section, wherein the insulating coating on the second jaw end spans portions of both the second base section and the second grasping section.

19. The method of claim 18, wherein the covering at least one of the first handle end, the first jaw end, the second handle end, or the second jaw end with one or more insulating coatings includes using an air-dry rubber material.

* * * * *